Jan. 19, 1965 H. M. TURNER 3,166,176
DEVICE FOR INDEXING CYLINDRICAL PLASTIC
BOTTLES FOR OFFSET PRINTING
Filed Jan. 8, 1962 7 Sheets-Sheet 5
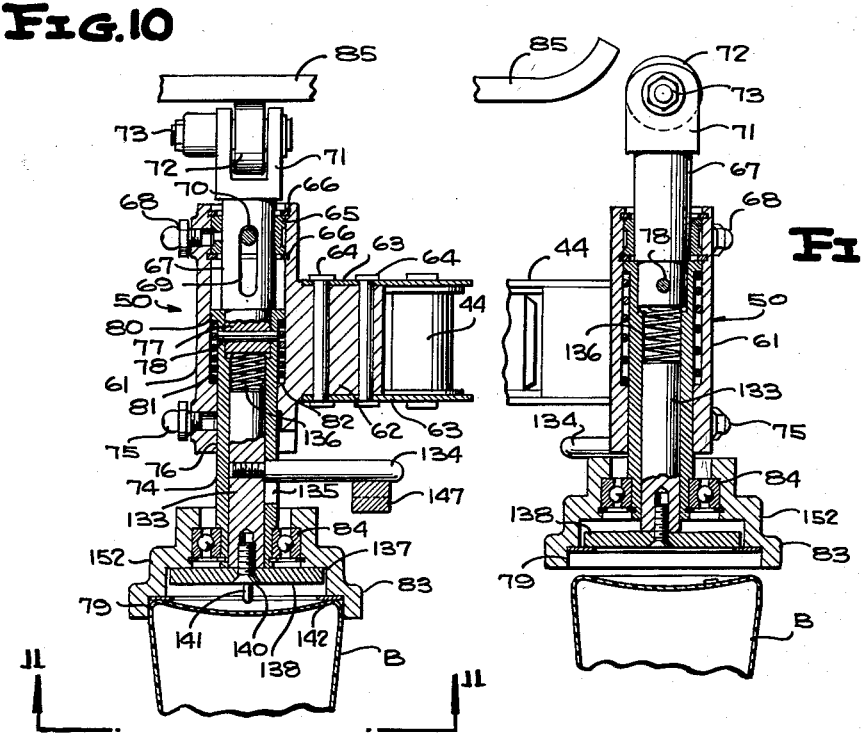
INVENTOR
HOWARD M. TURNER
BY Mason, Porter, Diller & Stewart
ATTORNEYS

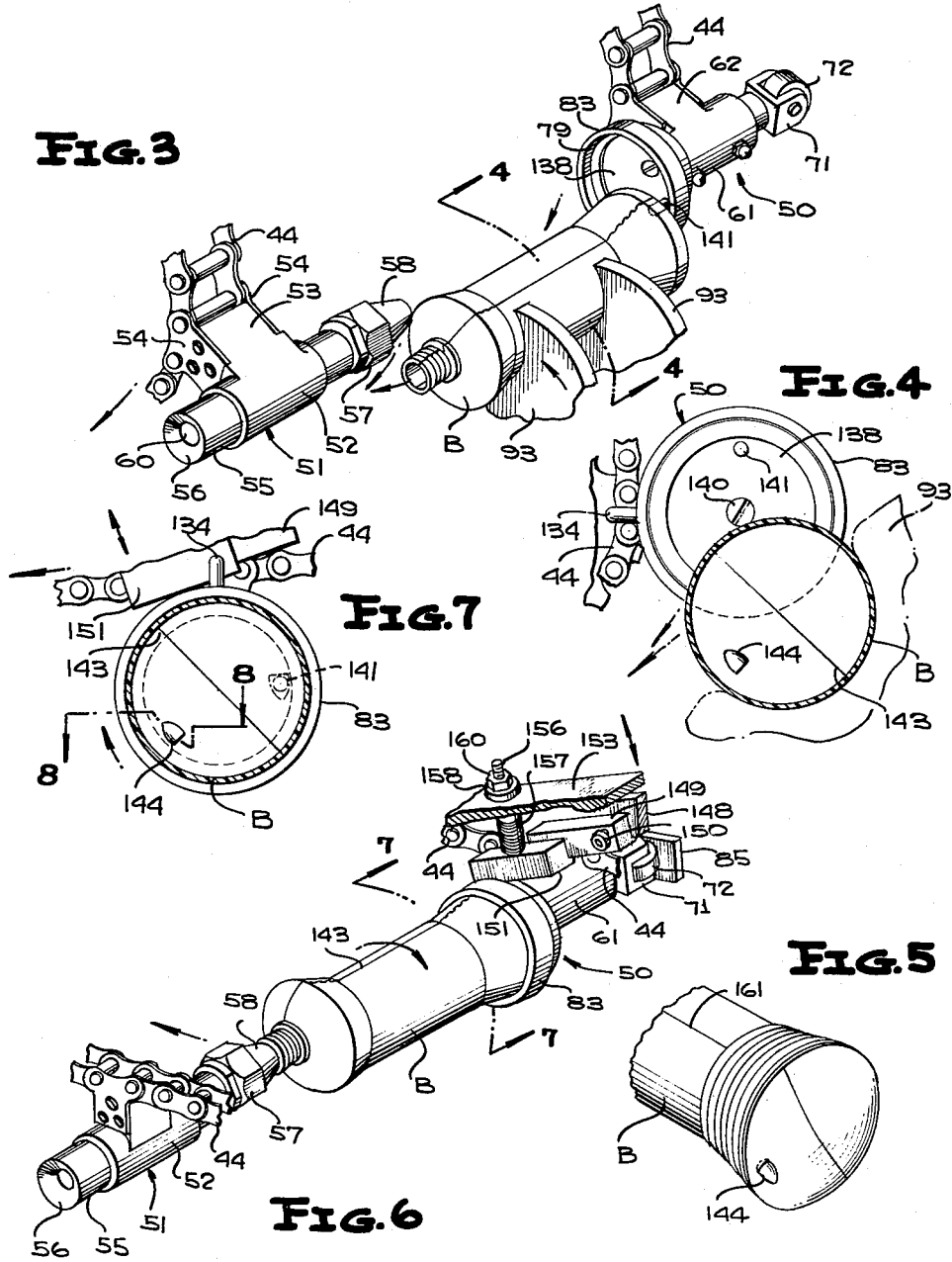

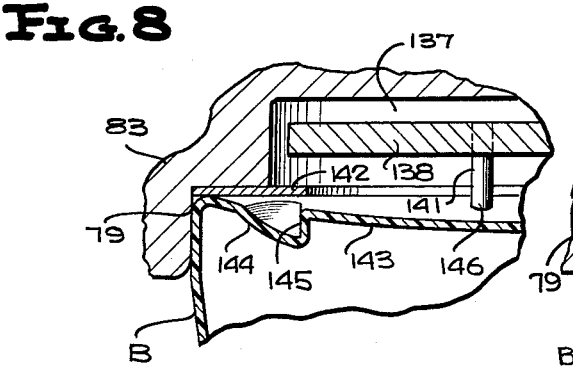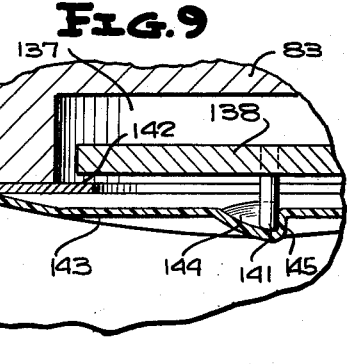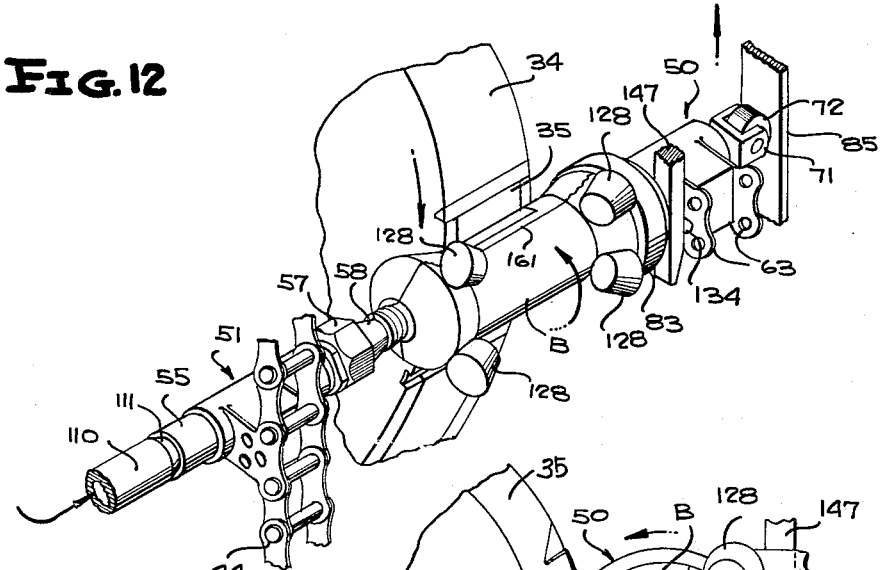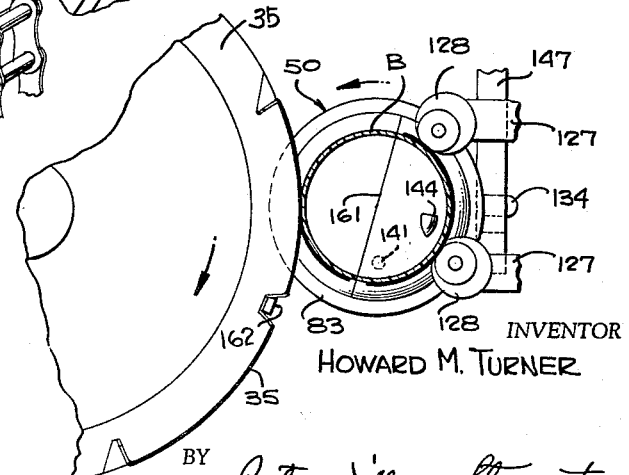

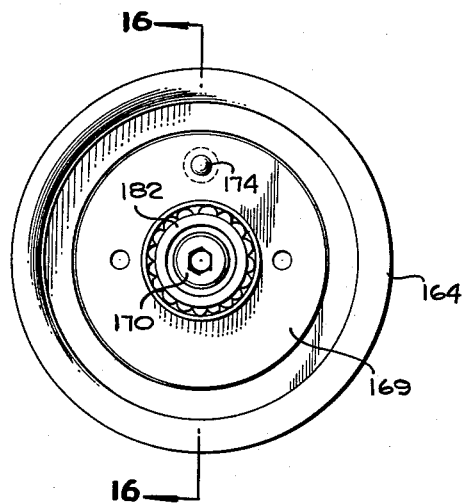
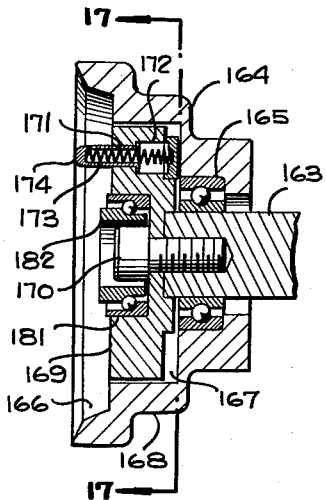
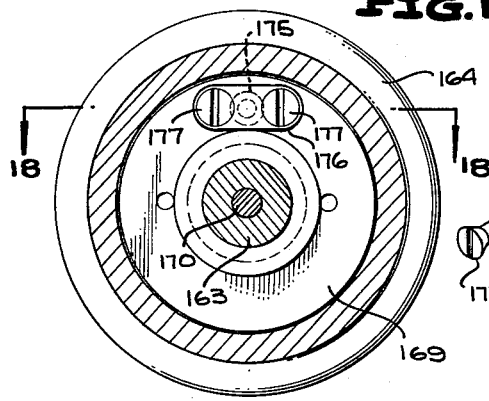
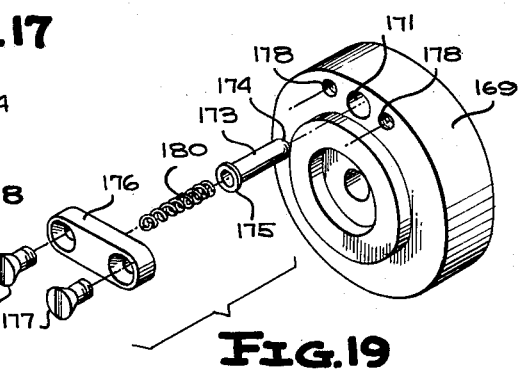
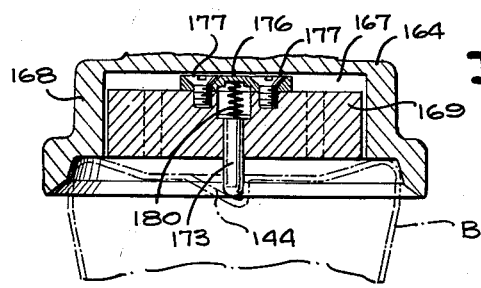

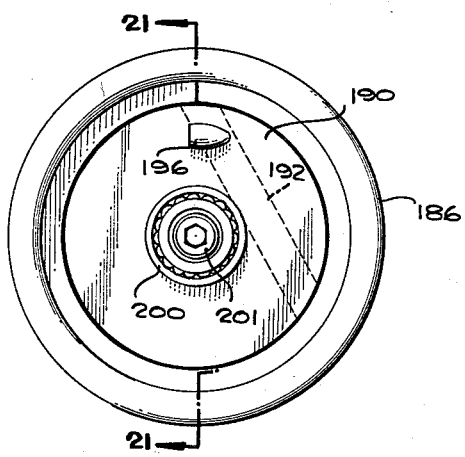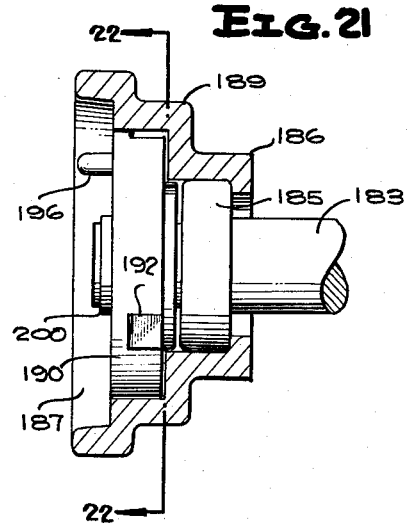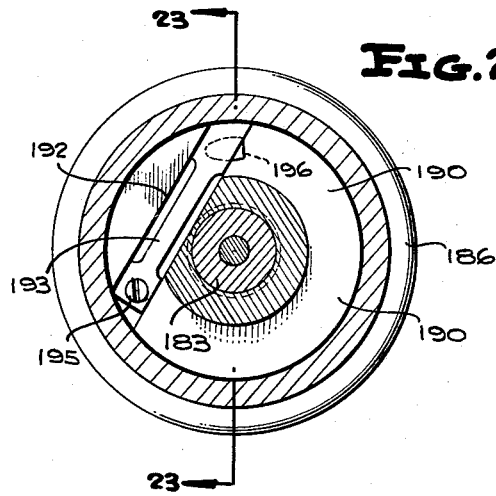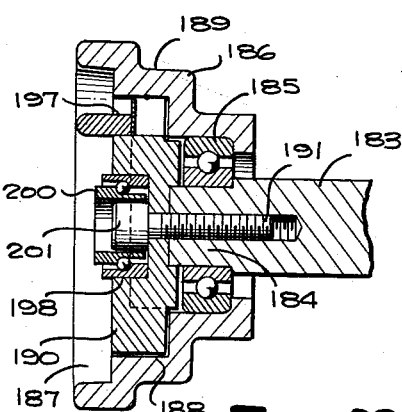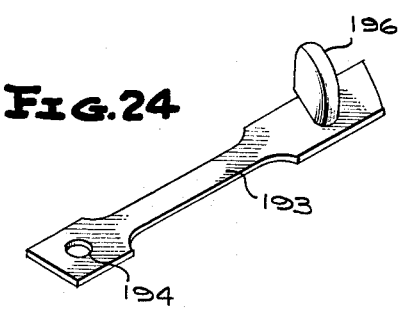
Jan. 19, 1965  H. M. TURNER  3,166,176
DEVICE FOR INDEXING CYLINDRICAL PLASTIC
BOTTLES FOR OFFSET PRINTING
Filed Jan. 8, 1962  7 Sheets-Sheet 7
INVENTOR
HOWARD M. TURNER
BY
Mason, Porter, Diller & Stewart
ATTORNEYS

United States Patent Office 3,166,176
Patented Jan. 19, 1965

---

3,166,176
DEVICE FOR INDEXING CYLINDRICAL PLASTIC BOTTLES FOR OFFSET PRINTING
Howard M. Turner, Oak Forest, Ill., assignor to Continental Can Company, Inc., New York, N.Y., a corporation of New York
Filed Jan. 8, 1962, Ser. No. 164,903
22 Claims. (Cl. 198—33)

This invention relates in general to new and useful improvements in the art of printing on articles such as cylindrical plastic bottles and the like, and more particularly relates to novel indexing means to be utilized in conjunction with a printing apparatus for indexing the articles to be printed prior to the presentation of the articles to a printing drum.

At the present time, there is commercially available a printing machine of the offset printing type which has a plurality of article holders carried by endless chains. The articles on which printing is to take place normally have parting lines thereon resulting from the molding thereof in longitudinally split molds. When printing is to be done on such articles, it is highly desirable that the printing be indexed with respect to the parting lines on the articles so that the parting lines will not be through the printed matter. A typical example of articles which are to be printed in accordance with this invention is cylindrical plastic bottles which have been formed by a blow molding process. The plastic bottles have diametrically opposite parting lines dividing the bodies thereof into two separate panels. Any printing which takes place on the bottles is preferably centered on these panels.

The commercially available printing machine receives bottles which are aligned only in that all like ends face in a like direction. The bottles are delivered from a conveyor to a feed wheel which, in turn, delivers the bottles to the holders of the printing machine. No means have been provided in the past for indexing the bottles. As a result, when the bottles are printed, the parting lines are indiscriminately placed and in practically all instances extend across the printed matter, deforming the printed matter.

In view of the foregoing, it is the object of the invention to provide the holders of the printing machine with means automatically operable to index bottles and like articles received by the holders prior to the presentation of the articles to the printing drum of the machine whereby the printing by the drum takes place on the articles intermediate the parting lines.

Another object of this invention is to provide novel indexing means for article holders of a printing machine for indexing the articles prior to the presentation of the articles to the printing drum of the machine, the indexing means including a projecting pin on each article holder for engagement within a recess in an associated article with the pin serving to index the article when presented to the printing drum of a machine and being releasable from the article during the printing operation whereby the article is free to rotate through its engagement with the printing drum.

A further object of this invention is to provide a novel method of indexing articles having parting lines and on which printing is to take place, the articles being formed with a recess in the bottom of each article, and the printing machine being provided with indexing pins adapted to project into the recesses of the articles to locate the articles, and there being provided means for automatically rotating the articles until the pins are aligned with the recesses in the articles to effect the desired indexing of the articles.

Still another object of this invention is to provide a novel holder for a printing machine particularly adapted to handle cylindrical bottles, preferably cylindrical bottles formed of plastic, the holder including a cup-shaped member for receiving the bottom end of a bottle, means supporting the cup-shaped member for rotation, and an indexing finger carried by a support and fixed against rotation, the indexing finger projecting into the cup-shaped member and being engageable in a recess in the bottom of a bottle to lock the bottle against rotation after the bottle has been rotated through the rotation of the cup-like member to effect the positioning of the pin into the bottle recess.

In a commercial printing machine particularly adapted for printing on bottles and the like, there are provided a plurality of holder units each of which includes opposed components for engaging the bottom and neck of a bottle and for clamping the two therebetween, that portion of the holder unit for the bottom of a bottle including a cup-shaped holder which is mounted for rotation whereby a bottle carried by a holder unit is freely rotatable during a printing operation through engagement of the printing drum with the bottle. It is another object of this invention to provide the cup-shaped holder with an indexing pin which is projectable into a recess in the bottom of a bottle when the bottle bottom is seated in the cup-shaped holder, with the pin being fixed against rotation and being retractable, whereby when a bottle is initially positioned within the holder unit and the bottle bottom is positioned within the cup-shaped holder, rotation of the cup-shaped holder and the bottle will result in the alignment of the pin with the recess in the bottom of the bottle so as to prevent further relative rotation of the bottle with respect to the support for the cup-shaped holder, and the pin being retractable when the bottle is engaged by the printing drum to permit the usual freedom of rotation of the bottle as is necessary during the printing operation while at the same time assuring the proper alignment of the bottle with respect to the printing drum to effect printing on the bottle intermediate parting lines formed on the bottle during the molding thereof.

With the above and other objects in view that will hereinafter appear, the nature of the invention will be more clearly understood by reference to the following detailed description, the appended claims and the several views illustrated in the accompanying drawings.

In the drawings:

FIGURE 3 is an enlarged fragmentary perspective view showing a bottle being transferred from the feed wheel of the printing machine to a holder unit of the machine.

FIGURE 4 is a fragmentary transverse longitudinal sectional view through the machine transversely of the holder unit and shows further the relative position of components of the holder unit, the feed wheel and the bottle immediately prior to the insertion of the bottle between the components of the holder unit.

FIGURE 5 is a fragmentary bottom perspective view of the bottle of FIGURE 3, and shows the indexing recess formed in the bottom thereof.

FIGURE 6 is a fragmentary perspective view of the bottle holder unit with the bottle clamped therebetween as it passes along the lower run of the path of the bottle holder unit and shows generally the details of means for effecting the rotation of the bottle to result in the indexing of the bottle in accordance with the invention.

FIGURE 7 is a fragmentary vertical sectional view taken transversely through the bottle of FIGURE 6 along the line 7—7 and shows schematically the movement of the bottle during the bottle indexing operation.

FIGURE 8 is an enlarged fragmentary sectional view taken along the line 8—8 of FIGURE 7, and shows the general relationship of the bottom of the bottle with respect to the indexing means of the bottle holder unit prior to the indexing of the bottle.

FIGURE 9 is a sectional view similar to FIGURE 8 and shows the relationship of the indexing means in the bottle after the indexing of the bottle.

FIGURE 10 is a horizontal sectional view taken through a holder unit along the line 10—10 of FIGURE 2, and shows the general details of the holder unit with a bottle clamped therein, intermediate portions of the bottle being omitted.

FIGURE 11 is a schematic elevational view with the bottle being shown in section and taken generally in the direction of the arrows 11—11 in FIGURE 10, and shows the relationship of a bottle with respect to the printing drum at the initiation of the printing operation.

FIGURE 12 is a fragmentary perspective view with parts schematically shown and illustrating the relationship of the bottle engaged with the printing drum during the printing operation.

FIGURE 13 is a view similar to FIGURE 11 and shows the relative rotated position of the bottle after an intermediate stage during the printing operation.

FIGURE 14 is a fragmentary horizontal sectional view similar to FIGURE 10 but taken along the line 14—14 of FIGURE 2 and shows the one-half of the holder unit in its retracted bottle releasing position.

FIGURE 15 is an elevational view looking into the end of one-half of a bottle holder unit utilizing a modified form of indexing means.

FIGURE 16 is a vertical sectional view taken along the line 16—16 of FIGURE 15 and shows further the specific details of the holder unit including the indexing means carried thereby.

FIGURE 17 is a vertical sectional view taken along the line 17—17 of FIGURE 16 and shows further the details of mounting of the indexing means.

FIGURE 18 is a fragmentary horizontal sectional view taken along the line 18—18 of FIGURE 17, and shows the details of the indexing means, a bottle positioned by the indexing means being shown in phantom lines.

FIGURE 19 is a rear exploded perspective view of the indexing attachment of the holder unit of FIGURE 15, and shows the specific details of the components thereof.

FIGURE 20 is an elevational end view similar to FIGURE 15 and shows another form of holder unit and indexing means.

FIGURE 21 is a vertical sectional view taken along the line 21—21 of FIGURE 20, and shows the general construction of the holder unit and the details of the indexing means.

FIGURE 22 is a vertical sectional view taken along the line 22—22 of FIGURE 21, and shows further the specific mounting of the indexing means.

FIGURE 23 is a vertical sectional view taken along the line 23—23 of FIGURE 22 and shows still more specifically the details of the indexing means and the general construction of the holder unit.

FIGURE 24 is an enlarged perspective view of the indexing pin and the leaf spring carrying the same.

Figure 1:
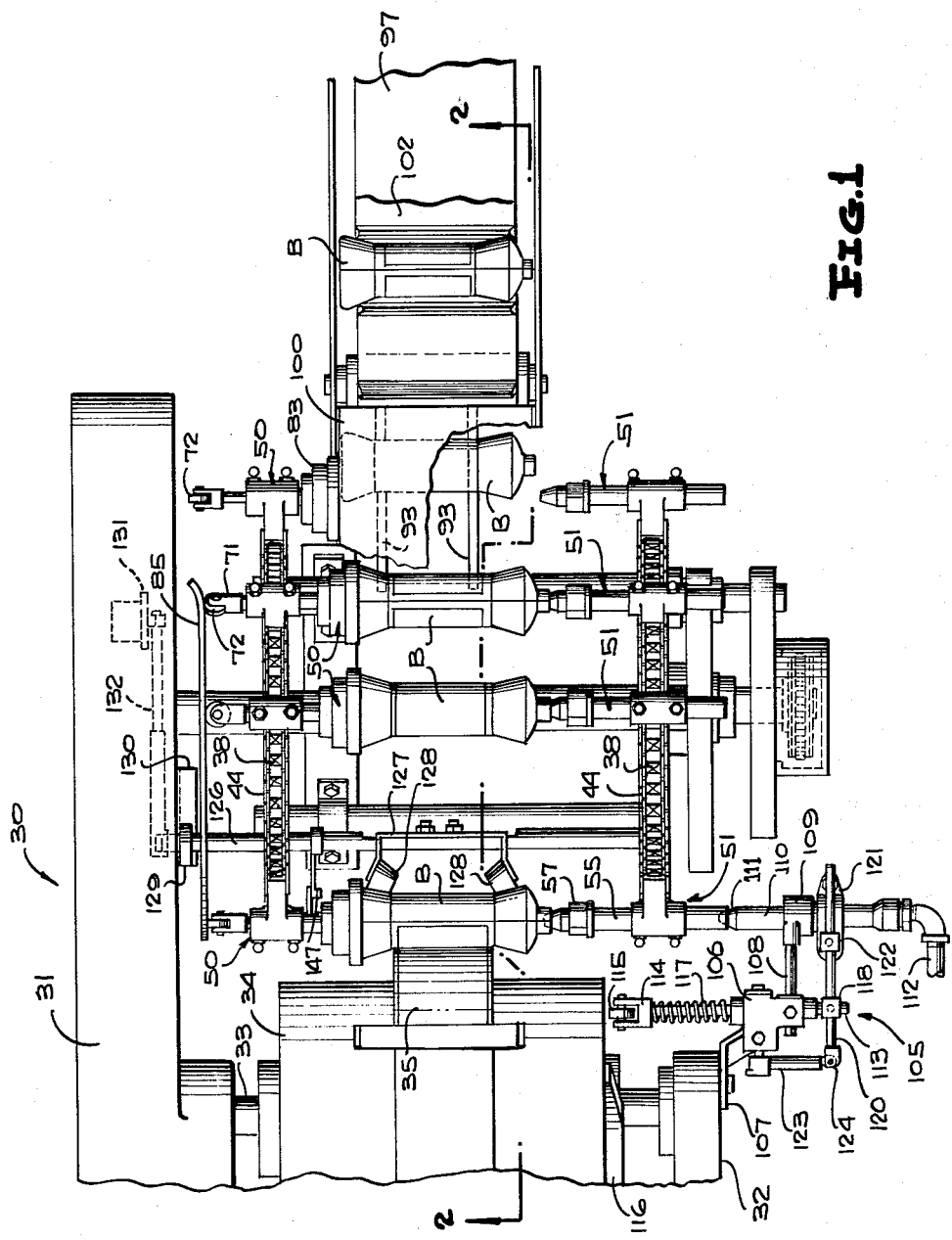
FIGURE 1 is a fragmentary plan view of an offset printing machine for bottles in which the indexing means of the invention is utilized.

Reference is now made to the drawings in detail, and more particularly to FIGURE 1 wherein there is illustrated an offset printing machine in accordance with this invention, the printing machine being referred to by the numeral 30. The printing machine 30 basically is of a conventional type and only those portions thereof having to do with this invention have been illustrated. Also, in FIGURE 1, certain of the holder units have been omitted for purposes of clarity. The printing machine 30 includes a frame construction which, for descriptive purposes, includes two side frame members 31 and 32. A shaft 33 extends transversely between the side frame members 31 and 32 and is suitably supported for rotation and suitably rotated in timed relation in a manner to be described hereinafter, all of this being conventional mechanism. The shaft 33 supports a printing drum 34 which is adapted to carry resilient mats or blankets of different widths and lengths in accordance with the printing requirements of the printing machine 30, the printing machine 30 being of the offset type. The printing machine 30 is of the multi-color type and the ink is transferred to the printing blanket carried by the printing drum 34 in the conventional manner of offset printing presses for transfer to the articles on which the printing is to take place. In the illustrated form of the invention, the printing blanket is referred to by the numeral 35 and is relatively narrow and short as compared to the printing drum 34. However, it is to be understood that the width of the printing blanket 35 may be greatly increased depending upon the articles upon which printing is to take place.

In order that the operation of the printing machine 30 may be readily understood and the description thereof more closely followed, it is pointed out at this time that after each printing operation, the machine is indexed to present another article to the printing drum 34 for the subsequent printing thereof.

The machine 30 is provided with an article handling assembly 36 for the purpose of delivering articles to the printing drum 34 to effect the necessary printing operation. The article handling assembly 36 includes upper transverse shaft 37 carried by the frame of the machine 30 and driven in timed relation to the operation of the machine 30. The shaft 37 carries a pair of spaced apart sprockets 38, as is best shown in FIGURE 1.

The article handling assembly 36 also includes a lower forwardly disposed shaft 40 which has an eccentrically disposed central portion. A pair of small diameter sprockets 41 are carried by the shaft 40 in alignment with the sprockets 38. A lower rear shaft 42 is also carried by the frame of the machine 30. The shaft 42 has rotatably journaled thereon sprockets 43 which lie in the planes of the sprockets 38 and 41. It is to be noted that the shaft 42 is disposed below the level of the shaft 40.

An endless conveyor chain 44 is entrained over each set of the sprockets 38, 41 and 43, and has an arcuate upper run 45, a downwardly moving vertical forward run 46, a downwardly and rearwardly sloping lower run 47, and an upwardly moving vertical rear run 48. The rear run 48 is positioned adjacent the printing drum 34.

A plurality of holder units, generally referred to by the numeral 49, are carried by the conveyor chains 44. One of the conveyor chains 44 carries an article bottom engaging holder unit half, generally referred to by the numeral 50, and the other of the conveyor chains 44 carries an article neck engaging holder unit half, generally referred to by the numeral 51. The holder unit halves 50 and 51 of each holder unit 49 are disposed in opposed aligned relation.

Reference is now made to FIGURE 3 in particular, wherein it will be seen that the holder unit half 51 includes a housing 52 having a mounting block 53 projecting therefrom. A pair of side plates 54 are carried by the associated conveyor chain 44 and are secured to the block 53. The housing 52 has a tube 55 fixed therein with the outer end of the tube 55 being provided with a conical seat 56 and the inner end of the tube 55 being provided with a removable fitting 57 having a conical nose portion 58 for insertion into the neck of an article, such as a plastic bottle, to be supported by the particular holder unit. The tube 55 has a bore 60 therethrough which also opens through the fitting 57 whereby compressed air may be delivered into an article to be printed.

Reference is now made to FIGURE 10 wherein the general details of construction of one of the holder unit halves 50 are illustrated. The holder unit half 50 inclues a tubular housing 61 having an integral mounting block 62 to which there are attached side plates 63 by means of rivets 64. The side plates 63 are, in turn, connected to the associated conveyor chain 44.

The outer end of the housing 61 has a bushing 65 seated therein and retained in place by means of retaining rings 66. A shaft 67 is mounted in the bushing 65 for sliding movement only and lubrication is provided to the bushing 65 by means of a grease fitting 68. The shaft 67 is provided with a longitudinal slot 69 in which a fixed pin 70 is received to prevent rotation of the shaft 67 relative to the housing 61 while permitting the necessary reciprocatory movement of the shaft 67.

The outer end of the shaft 67 is provided with a bifurcated fitting 71 in which there is mounted a cam follower 72 carried by a suitable shaft unit 73.

A second shaft 74 is slidably mounted in the tubular housing 61 and a second grease fitting 75 is provided for lubricating the inner end of the housing 61. It is to be noted that the bore 76 of the inner end of the housing 61 is reduced as compared to that of the outer portion thereof. The shaft 74 has an outer end which is telescoped over a reduced inner end portion 77 of the shaft 67 with the two shaft portions being connected together by a pin 78.

A collar 80 is carried by the reduced portion 77 of the shaft 67 outwardly of its connection with the shaft 74. The collar 80 bears against a coil spring 81 which is disposed in surrounding relation with respect to the outer end of the shaft 74 and the inner end of the coil spring 81 is seated on the shoulder 82 formed by the differential in diameters of the bore portions of the housing 61. In this manner, the shaft 67 and 74 are always urged towards a retracted position.

A cup-shaped holder 83 is rotatably supported on the inner end of the shaft 74 by means of a bearing 84. The holder 83 is provided with a socket 79 in which the bottom of an article, such as the bottle B illustrated, is adapted to be received.

With reference to FIGURE 10, it is pointed out that when the cup-shaped holder 83 is retracted, the bottle B may be positioned between the holder unit halves 50 and 51 and in alignment therewith. The bottle B has a neck N into which the nose 58 of the fitting 57 may be positioned. When the bottle B is disposed in alignment with the holder unit halves 50 and 51, the cam follower 72 rides up on a cam 85 which moves the shaft 67 inwardly, thus moving the shaft 74 and the holder 83 inwardly. The holder 83 first receives the bottom of the bottle B, and then moves the bottle B towards the nose 58 with the result that in the final position of the holder unit 49, the bottle B is clamped between the holder 83 and the nose 58 in the manner shown in FIGURE 10.

The conventional machine 30 is also provided with a feed wheel assembly, generally referred to by the numeral 86. The feed wheel assembly 86 includes a shaft 87 extending transversely of the machine 30 and suitably journaled for rotation by means supported by the machine 30 in a conventional manner. The shaft 87 is provided with a sprocket 88 over which there is entrained a drive chain 89. The drive chain 89 is driven by a sprocket 90 which is carried by a drive shaft 91 suitably supported and driven by other mechanism of the machine 30 which is not a part of the invention. A pair of idler sprockets 92 are provided for supporting the chain 89.

The feed wheel assembly 86 includes at least two feed wheels 93 which are mounted on the shaft 87 in spaced relation. The feed wheels 93 are provided with a plurality of circumferentially spaced pockets 94 with the pockets 94 of all the feed wheels 93 being transversely aligned.

An article delivery conveyor, generally referred to by the numeral 95, is provided for supplying articles to the feed wheel assembly 86. The article delivery conveyor 95 includes side plates 96, of which only one is shown, betwen which an endless conveyor belt 97 runs. The conveyor belt 97 has the opposite ends thereof supported by suitable rollers 98 of which only one is shown.

After the desired printing operation has taken place, the bottles move to the upper part of the article delivery assembly 36 where they are released immediately above a chute 100. The released articles pass onto an article take-away conveyor, generally referred to by the numeral 101, which is illustrated as having an endless conveyor belt 102 supported in the customary manner on rollers including the roller 103 illustrated. The conveyor belt 102 is preferably provided with transversely extending ribs 104 to prevent contact of newly printed bottles or other articles with each other.

When the articles handled by the printing machine 30 are plastic bottles or other readily deformable members, it is desired that compressed air be admitted into the interior of the article to rigidify the same during the printing operation. To this end, there is provided a pressurizing unit generally referred to by the numeral 105 which cooperates with the holder unit halves 51. The pressurizing unit 105 includes a housing 106 which is supported from the side frame 32 by means of a bracket 107. An arm 108 extends from the housing 106 and supports a guide 109 for a nozzle 110 which is provided with a tapered end 111 adapted to seat on the seat 56 of the shaft 55 in the manner shown in FIGURE 10. The nozzle 110 has a compressed air line 112 connected thereto for supplying compressed air to the nozzle 110 in timed relation to the operation of the printing machine 30. This flow of compressed air is controlled in a conventional manner by means of a valve, not shown.

A rod 113 extends through the housing and is suitably supported therein for reciprocatory movement. The inner end of the rod 113 is provided with a bifurcated fitting 114 for supporting a cam follower 115. The cam follower 115 is engageable with a cam 116 carried by the printing drum 34 for moving the rod 113 outwardly. A coil spring 117 encircles the rod 113 and bears against the housing 106 at one end and against the bifurcated fitting 114 at the other end to urge the rod 113 inwardly.

A swivel type connector 118 is carried by the outer end of the rod 113 and supports a generally longitudinally extending rod 120. The rod 120 has connected to one end thereof a clamp 121 which is clamped about the nozzle 110 and connects the nozzle 110 to the rod 120 for movement therewith. A swivel fitting 122 is provided between the rod 120 and the clamp 121 in that the clamp 121 must pivot due to the fact that the movement of the nozzle 110 is a straight line movement.

An arm 123 extends from the housing 106 generally parallel to the rod 113. A fitting 124 pivotally connects the rod 120 to the arm 123.

In FIGURE 1, it will be readily apparent that the cam 116 normally holds the nozzle 110 in a retracted position. However, after the printing machine 30 has been indexed and as the printing drum 34 rotates, the cam follower 115 will ride off of the cam 116 and the spring 117 will move the rod 113 inwardly with the result that the nozzle 110 will be engaged with the shaft 55 of the associated holder unit half 51 to supply compressed air through the shaft 55 and through the fitting 57 into the article indexed for engagement by the printing blanket 35 so as to rigidify the article.

The machine 30 also includes an article back-up unit which is generally referred to by the numeral 125. The article back-up unit 125 is disposed in opposition to the printing drum 34 and serves to back up an article during the printing operation. The article back-up unit 125 includes a transverse shaft 126 which supports a bracket 127. The bracket 127, in turn, supports two sets of back-up rollers 128. It will be understood that the size, spacing and shape of the back-up rollers 128 will vary depending upon the particular shape of the article on which the printing operation is to take place.

The shaft 126 is provided at the opposite ends thereof with rollers 129 which are mounted on suitable supports 130 carried by the frame of the printing machine 30. The printing machine 30 includes a swing arm 131 which is swung in timed relation to the indexing of the machine. An adjustable link 132 connects the swing arm 131 to the shaft 126. It is to be understood that during an indexing operation, the rollers 128 are retracted by the movement imparted thereto by the swinging arm 131, the adjustable link 132, the shaft 126 and the bracket 127, and similarly after an article to be printed on has been indexed to the printing position, the rollers 128 are moved into their article backing up position by the elements 131, 132, 127 and 128, as is clearly shown in FIGURE 2.

With the exception of certain features of the holder unit half 50, which will be set forth in detail hereinafter, the afore-described components of the offset printing machine 30 are conventional and are in themselves not a part of the invention. However, in order to understand the application of the present invention to an existing machine, it has been deemed advisable to specifically set forth the details of the printing machine with which the present invention is associated. The operation of the printing machine 30 without the incorporation of the invention will be described here.

*Operation*

In the normal operation of the machine 30 prior to the invention, articles on which printing was to take place were delivered by the article delivery conveyor 95 to the feed wheel unit 86. The feed wheel unit 86 transversely aligned the articles for positioning between the halves of the holder units 49. During each indexing of the machine 30, an article, such as the bottle B, is transferred to one of the holder units 49. This transfer is accomplished by positioning the bottle between the holder unit halves 50 and 51 and while so aligned moving the holder unit half 50 towards the holder unit half 51 to move the bottle into engagement over the nose 58 of the fitting 57 of the holder unit half 51 while clamping the bottom of the bottle.

The bottles are moved about the general path defined by the holder units 49 and 51 during the various indexing of the machine 30 so that in turn each bottle is presented to the printing drum 34. When a bottle is presented to the printing drum 34, it is backed up by the back-up rollers 128 and during the rotation of the printing drum 34, the bottle is engaged by the printing blanket 35 to transfer the ink thereon to the periphery of the bottle while the bottle turns.

At the termination of the printing operation, the newly printed bottle is moved away from the printing station through the indexing of the machine 30, after which it is finally discharged onto the chute 100 and delivered to the article take-away conveyor 101.

The operation of the printing machine 30 is satisfactory when the printing surface of the article to be printed is continuously smooth. However, many articles, particularly those which are molded, have parting lines thereon, and these parting lines interfere with the printing operation in that the parting lines do not provide a suitable continuous printing surface. It is therefore highly desirable to have the printing on articles of the type with parting lines disposed between the parting lines. In order to accomplish this, it is necessary to index the articles prior to the presentation thereof to the printing drum 34. It is to this end that the invention is directed.

Referring once again to FIGURE 10 in particular, it is to be understood that the original holder unit half of the machine 30 which corresponds to the holder unit half 50 is of a construction similar to that illustrated in FIGURE 10, although the holder 83 has been specifically provided, and the construction of the shafts 67 and 74 is different from that of the original holder unit half.

The previous description of the holder unit half 50 is incomplete and will be completed here in order to more particularly set forth the invention. In addition to the aforedescribed parts of the holder unit half 50, the shaft 74 is hollow and has another shaft 133 disposed therein for sliding movement. The shaft 133 is provided with an operator pin 134 which extends at right angles thereto and out through a longitudinal slot 135 in the shaft 74. The shaft 133 is urged inwardly by a spring 136 which bears against the inner end of the shaft 67 and the outer end of the shaft 133.

The holder 83 has a second recess 137 disposed inwardly of the recess 79. A plate 138 is mounted in the recess 137 for reciprocatory movement axially of the holder 83. The plate 138 is rigidly secured to the shaft 133 for reciprocation therewith by means of a fastener 140. An indexing pin or finger 141 is positively affixed to and carried by the plate 138 for non-rotational but reciprocal movement therewith. It is to be understood that the indexing pin 141 can only reciprocate axially of its length and cannot rotate due to the fixing of the plate 138 against rotation. A stop ring 142 is pressed into the bottom of the recess 79 to limit the inward movement of the plate 138.

Reference is now made to FIGURE 8 in particular wherein it will be seen that the bottle B which is intended to be held by the holder 83 has a bottom wall 143 which has formed therein adjacent the outer edge thereof a generally circumferentially extending indexing recess 144. The indexing recess 144 has a sloping bottom wall and terminates in a stop shoulder 145.

When the bottle B is initially clamped within the holder unit 49, in most instances the recess 144 will not be aligned with the indexing pin 141, but will be circumferentiallly spaced therefrom, as shown, for example, in FIGURE 8. The indexing pin 141, which has a rounded exposed end 146, thus comes to bear against the bottom wall 143 and is urged outwardly in opposition to the spring 136. However, the recess 144 and the pin 141 are so related that if the bottle B is rotated, the pin 146 will ride on the surface of the bottom wall 143 and then into the recess 144, coming to rest against the stop 145, as is clearly shown in FIGURE 9. Further rotation of the bottle in the particular direction described above is prevented by the engagement of the stop shoulder 145 with the pin 141. On the other hand, the bottle B is free to be rotated in the opposite direction and during such rotation the pin will ride up out of the recess 144 and onto the bottom wall 145.

Although the pin 141 is self-releasing, in the form of indexing device illustrated in FIGURE 10, the pin 134 serves as the means for retracting the pin 141 automatically at the printing station, and to this end, a cam 147 is provided for automatically retracting the pin 141.

Figure 2:
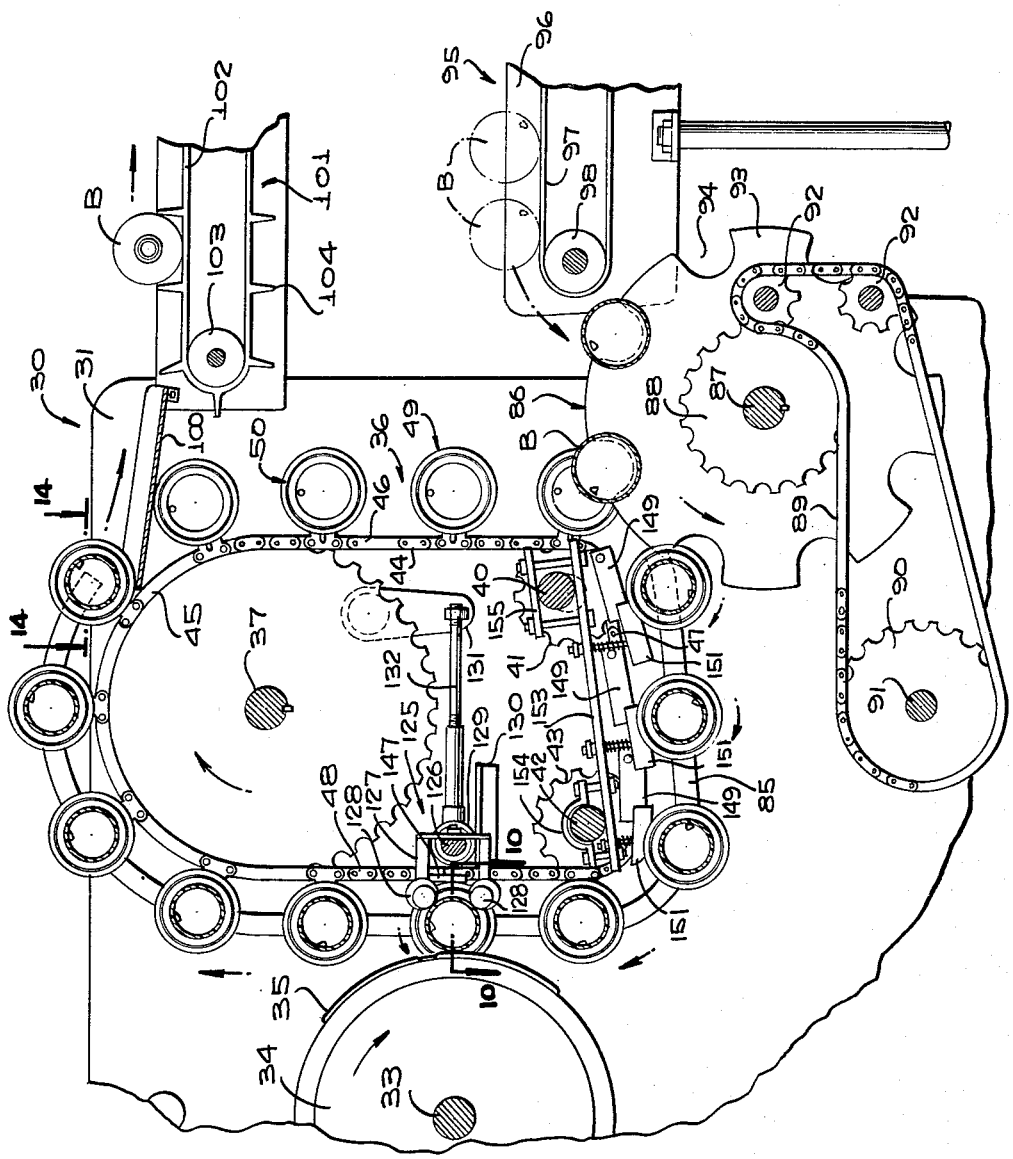
FIGURE 2 is a longitudinal sectional view taken along the line 2—2 of FIGURE 1, and shows more specifically the details of the bottle handling mechanism of the printing machine.

Reference is now made to FIGURES 2 and 6 in particular, wherein the details of means for effecting the rotation of the bottles for indexing purposes are shown. These means include a suitable support 148 which is carried in any desired manner by the frame of the machine 30. To the support 148 are pivotally mounted three blocks 149 by means of pivot pins 150, there being one block 149 for each of the three holder units 49 disposed along the lower run 47 of the endless conveyor chains 44. To each block 149 is rigidly secured in offset relation a brake shoe 151 which is aligned with the path of shoulders 152 on the holders 83, as is clearly shown in FIGURES 10 and 14.

As was previously described, the shaft 40 is provided with an eccentric central portion. A plate 153 extends between the shafts 40 and 42 in overlying relation to the brake shoes 151 and is clamped to the shaft 42 for pivotal movement by means of a clamp 154. A second clamp 155 connects the other end of the plate 153 to the eccentric portion of the shaft 40. Thus, as the shaft 40 rotates during the indexing of the holder units 49, the right end of the plate 153 is lowered and then raised.

Each of the brake shoes 151 has a threaded member 156 extending upwardly therefrom and through the plate 153. A spring 157 is carried by the threaded member 156 intermediate the brake shoe 151 and the underside of the plate 153. A washer 158 and a nut 160 are carried by the upper end of each threaded member 156 to restrict the downward movement of each threaded member 156.

During the indexing of the holder units 49, the three lowermost holder units 49 are aligned with the brake shoes 151. As the shaft 40 rotates, the brake shoes 151 are brought into engagement with the holders 83 along the shoulders 152 thereof. This retards the movement of the holders 83 of the lowermost holder units 49 and since the lowermost holder units 49 are moving during the indexing operation, the holders 83 will be rotated a limited amount due to the resistance to movement thereof caused by the brake shoes 151. In this manner, during the indexing of the holder units 49, the holders 83 and the bottles B carried thereby are rotated. Reference is now made to FIGURE 4 in particular, wherein it is shown that when a typical bottle B is inserted into the holder 83, of the holder unit half 50, the recess 144 for indexing purposes formed in the bottom wall 143 of the bottle is not aligned with the indexing pin 141. However, as is clearly illustrated in FIGURE 7, as the holder units 49 and the associated bottles move beneath the brake shoes 151, the holders 83 are rotated in a clockwise direction with the result that the bottles are rotated relative to the pins 141 and the pins 141 enter into the recesses 144 and the stop shoulder 145 comes to bear against the pin 141, thus terminating the rotation of the bottle in an indexed position. Although the holder 83 for a particular bottle may be continued to be rotated, it will slip with respect to the bottle B.

Reference is made to the bottle B shown in FIGURE 5. It is to be noted that the bottle B is formed with a parting line 161 which must be properly indexed with respect to the printing blanket 35 of the printing drum 34. In FIGURE 11, it is shown that the bottle B is so indexed that the printing on the cylindrical portion thereof starts immediately behind the parting line 161. It is further to be noted that the printing blanket 35 has an intermediate depressed area 162 which aligns with and clears the diametrically opposite portion of the parting line 161. Due to this particular indexing of the bottle B with respect to the printing blanket 35, it will be readily apparent that the printing on the bottle B takes place between the parting lines and in centered relation with respect thereto. In FIGURE 13, a continued relative movement of the printing blanket 35 and the bottle B is shown, with the printing on the bottle B being indicated.

It is to be understood that during the printing operation, the pin 141 has been retracted from within the recess 144 and the bottle B is free to rotate with the holder 83 without drag from the pin 141. After the printing operation has been completed and the printed bottle shifted from the printing station during the indexing of the machine 30, the pin 134 rides off of the cam 147 with the result that the pin 141 again engages the bottom of the bottle B. However, in most instances, the bottle will have been rotated one full revolution so that the pin 141 again enters into the recess 144.

At this time, it is pointed out, as viewed in FIGURES 2, 11 and 13, that the printing drum 34 is rotating in a clockwise direction. However, in some of the machines, the printing drum is rotated in a counterclockwise direction. When the printing drum so rotates, it is necessary that the recesses 144 face in the opposite direction and that indexing of the bottles B be obtained by rotating the bottles in a counterclockwise direction. This is accomplished by placing the brake shoes for effecting the rotation of the holders 83 beneath the holders in lieu of being above the holders, as is shown in FIGURE 2. It is also pointed out at this time that in lieu of brake shoes, the holders 83 may be provided with gear portions and fixed racks provided for effecting the rotation of the holders by engagement with the gear portions.

Reference is now made to FIGURE 15 through 19 wherein a slightly different form of holder construction is illustrated. In lieu of the tubular shaft 74, a solid shaft 163 is provided. A cup-shaped holder 164, which is very similar to the holder 83, is carried by the shaft 163 for rotation by means of a bearing 165. It is to be noted that the holder 164 has a first recess 166 for receiving the bottom of a bottle and a second recess 167, the purpose of which will be described in more detail hereinafter. It is also to be noted that the holder 164 has a shoulder 168 which corresponds to the shoulder 152, whereby the holder 164 may be readily rotated.

An indexing plate 169 is seated in the recess 167 and is fixedly secured to the shaft 163 against rotation by means of a fastener 170.

The plate 169 is provided with a bore 171 in the outer portion thereof, the bore 171 being an axially extending bore and having an enlarged rear portion 172. A tubular pin or finger 173 extends through the bore 171 and normally projects to the left from the plate 169, as shown in FIGURE 16. The projecting end of the pin 173 is rounded, as at 174, and the opposite end of the pin 173 is provided with an outwardly directed collar 175 which is disposed in the bore portion 172 and limits the movement of the pin 173 through the plate 169. The pin 173 is rotatable about its own axis and is reciprocally mounted for movement both through the bore portion 172 and with the plate 169.

A spring seat 176 overlies the rear end of the bore portion 172. The spring seat 176 is held in place by fasteners 177 which are threaded into bores 178 in the plate 169. A coil spring 180 is disposed within the tubular pin 173 and bears against the spring seat 176, as is clearly shown in FIGURES 16 and 18.

The exposed face of the plate 169 is provided with a centrally located recess 181 in which the head of fastener 170 is countersunk. A thrust bearing 182 is seated in the recess 181 and projects therefrom a slight distance for engagement with the bottom of bottles to effect the ease of rotation of the bottles with respect to the holder 164 after the indexing of the bottle has been accomplished.

It is to be understood that the operation of the holder 164 and the indexing means associated therewith will be the same as that of the holder 83 in indexing a bottle. On the other hand, when the holder 164 and an associated bottle B reaches the printing station of the machine 30, in lieu of the pin 173 being automatically retracted, the pin 173 remains in the recess 144, and as the bottle is rotated during the printing operation, the rounded end 174 of the pin 173 will ride up out of the recess 144 due to the cam configuration of the bottom surface thereof, and the rounded end 174 will ride on the bottom of the bottle during the printing operation.

Reference is now made to FIGURES 20 through 24, wherein there is illustrated still another slightly modified form of holder and indexing means. In the form of the invention illustrated in these figures, there is shown a shaft 183 which corresponds to the shaft 163 and which has a reduced end portion 184 on which there is seated a bearing 185. The bearing 185 carries for rotation a holder 186 which corresponds to the holders 83 and 164. The holder 186 has a first recess 187 for receiving the bottom of a bottle, and a second recess 188 for a purpose to be described hereinafter. The holder 186 is also provided with a shoulder 189 on which the brake shoes 151 may ride.

A plate or block 190 is positioned in the recess 188 and is secured onto the end of the shaft 183 by means of a fastener 191. The exposed face of the plate 190 is generally flush with the bottom of the recess 187.

Reference is now made to FIGURE 22 in particular, wherein it will be seen that the rear of the plate 190 is provided with a diagonal recess 192. A leaf spring 193, best shown in FIGURE 24, is seated in the recess 192. One end of the leaf spring 193 has an opening 194 therethrough through which a fastener 195 passes and is engaged in the plate 190 to secure the end of the leaf spring 193 to the plate 190 in the bottom of the recess 192. The opposite end of the leaf spring 193 carries a finger or pin 196 which is of a configuration corresponding generally to the configuration of the recess 144 in the bottom of the bottle B. A suitable opening 197 is formed in the plate 190 with the opening 197 extending from the recess 192 through the exposed face of the plate 190. The finger 196 projects through the plate 190 into the recess 187 for engagement with the bottom of a bottle.

The exposed face of the plate 190 is provided with a recess 198 in which there is seated a thrust bearing 200. The thrust bearing 200 is intended to engage the bottom of a bottle and permit rotation of the holder 186 relative to the bottom of a bottle after the bottle has been indexed. The fastener 191 has a head 201 which is seated generally within the confines of the thrust bearing 200.

It is to be understood that the operation of the indexing means illustrated in FIGURES 20 through 24 will be the same as that of the indexing means illustrated in FIGURES 15 through 19. However, because of the shape of the finger 196, a more secure indexing operation may be obtained with the indexing means of FIGURES 20 through 24.

At this time, it is pointed out that if it is so desired, in lieu of the pin 141, the plate 138 may carry a finger corresponding to the finger 196. The operation of the indexing means shown in FIGURE 10, for example, will remain the same except for the shape of the pin or finger.

From the foregoing, it will be apparent that the indexing means disclosed herein will operate to properly index bottles and other articles having parting lines so that the parting lines are properly positioned with respect to the printing blanket during the printing operation whereby the printing on the bottle or article is confined to the areas between the parting lines and does not extend across the parting lines.

From the foregoing, it will be seen that novel and advantageous provision has been made for carrying out the desired end. However, attention is directed to the fact that other variations may be made in the example method and apparatus disclosed herein without departing from the spirit and scope of the invention, as defined in the appended claims.

I claim:

1. An indexing type holder unit for bottoms of bottles and like articles each having a recess therein defining a stop wall, said holder unit comprising a support, a cup-shaped holder, means mounting said cup-shaped holder on said support for rotation relative thereto, a finger adapted to be inserted in an article bottom recess, and non-rotatable means mounting said finger within the general confines of said cup-shaped holder for retracting movement axially of said cup-shaped holder.

2. An indexing type holder unit for bottoms of bottles and like articles each having a recess therein defining a stop wall, said holder unit comprising a support, a cup-shaped holder, means mounting said cup-shaped holder on said support for rotation relative thereto, said cup-shaped holder having an inner recess, a plate recessed within said inner recess, means connecting said plate to said support and fixing said plate against rotational movement relative to said support, a finger adapted to be inserted in an article bottom recess, said finger being carried by said plate for retracting movement axially of said cup-shaped holder.

3. An indexing type holder unit for bottoms of bottles and like articles each having a recess therein defining a stop wall, said holder unit comprising a support, a cup-shaped holder, means mounting said cup-shaped holder on said support for rotation relative thereto, said cup-shaped holder having an inner recess, a plate recessed within said inner recess, means connecting said plate to said support and fixing said plate against rotational movement relative to said support, a finger adapted to be inserted in an article bottom recess, said finger being carried by said plate for retracting movement axially of said cup-shaped holder, and resilient means reacting on said finger and holding said finger in a projected position while resiliently resisting retraction of said finger.

4. The holder unit of claim 3 wherein said finger is slidable through said plate and said resilient means directly acts on said finger.

5. The holder unit of claim 3 wherein said finger is slidable through said plate and said resilient means directly acts on said finger, said resilient means being a leaf spring and said finger being carried by said leaf spring.

6. The holder unit of claim 3 wherein said finger is slidable through said plate and said resilient means directly acts on said finger, said resilient means being concentric with and telescope relative to said finger.

7. The holder unit of claim 3 wherein said finger is fixedly secured to said plate, and said resilient means reacts on said plate.

8. An indexing type holder unit for bottoms of bottles and like articles each having a recess therein defining a stop wall, said holder unit comprising a support, a cup-shaped holder, means mounting said cup-shaped holder on said support for rotation relative thereto, said cup-shaped holder having an inner recess, a plate recessed within said inner recess, means carried by said support mounting said plate for movement axially of said cup-shaped holder, a finger carried by said plate for movement therewith.

9. An indexing type holder unit for bottoms of bottles and like articles each having a recess therein defining a stop wall, said holder unit comprising a support, a cup-shaped holder, means mounting said cup-shaped holder on said support for rotation relative thereto, said cup-shaped holder having an inner recess, a plate recessed within said inner recess, means carried by said support mounting said plate for movement axially of said cup-shaped holder, a finger carried by said plate for movement therewith, and resilient means carried by said support reacting on said means mounting said plate holding said plate and said finger in a projected position while resiliently resisting retraction of said finger.

10. An indexing type holder unit for bottoms of bottles and like articles each having a recess therein defining a stop wall, said holder unit comprising a support, a cup-shaped holder, means mounting said cup-shaped holder on said support for rotation relative thereto, said cup-shaped holder having an inner recess, a plate recessed within said inner recess, means carried by said support mounting said plate for movement axially of said cup-shaped holder, a finger carried by said plate for movement therewith, resilient means carried by said support reacting on said means mounting said plate holding said plate and said finger in a projected position while resiliently resisting retraction of said finger, and means for automatically retracting said plate and finger.

11. An indexing type holder unit for bottoms of bottles and like articles each having a recess therein defining a stop wall, said holder unit comprising a support, a cup-shaped holder, means mounting said cup-shaped holder on said support for rotation relative thereto, said cup-shaped holder having an inner recess, a plate recessed within said inner recess, means carried by said support mounting said plate for movement axially of said cup-shaped holder, a finger carried by said plate for movement therewith, resilient means carried by said support reacting on said means mounting said plate holding said plate and said finger in a projected position while resiliently resisting retraction of said finger, an arm connected to said plate mounting means, and a cam for shifting said arm to retract said plate and said finger against the urging of said resilient means.

12. An indexing type holder unit for bottoms of bottles and like articles each having a recess therein defining a stop wall, said holder unit comprising a support, a cup-shaped holder, means mounting said cup-shaped holder on said support for rotation relative thereto, a finger adapted to be inserted in an article bottom recess, means mounting said finger within the general confines of said cup-shaped holder for retracting movement axially of said cup-shaped holder and holding said finger fixed against rotational movement, and means for engaging said cup-shaped holder for rotating said cup-shaped holder to move an article carried by said cup-shaped holder to an indexed position.

13. In an article feed apparatus, an indexing type holder unit for bottoms of bottles and like articles each having a recess therein defining a stop wall, said holder unit comprising a support, a cup-shaped holder, means mounting said cup-shaped holder on said support for rotation relative thereto, a finger adapted to be inserted in an article bottom recess, means mounting said finger within the general confines of said cup-shaped holder for retracting movement axially of said cup-shaped holder and holding said finger fixed against rotational movement, means mounting said holder unit for movement along a predetermined path, and means along said holder unit path for rotating said cup-shaped holder during the movement of said holder unit to move an article carried by said cup-shaped holder to an indexed position.

14. The apparatus of claim 13 wherein said holder rotating means include a holder holding member disposed along the path of movement of said holder unit to effect a temporary rolling of said cup-shaped holder.

15. The apparatus of claim 13 wherein said holder rotating means are in the form of at least one brake shoe resiliently engageable with the periphery of said cup-shaped holder.

16. The apparatus of claim 13 wherein said holder rotating means are in the form of at least one brake shoe resiliently engageable with the periphery of said cup-shaped holder, means mounting said brake shoe for movement between a cup-shaped holder engaging position and a released position, and means operable by said means mounting said holder unit for movement along said predetermined path for moving said brake shoe between the engaging and released positions thereof.

17. An indexing type holder unit for bottles and like articles having a cylindrical surface, said holder unit comprising a fixed holder member and a movable holder, a non-rotatable supporting shaft, means mounting said movable holder on said supporting shaft for rotation about the axis of said supporting shaft, a housing supporting said supporting shaft for sliding movement axially of said supporting shaft to shift said movable holder between an article clamping position and a released position, and article indexing means carried within said movable holder for indexing an article.

18. The holder unit of claim 17 wherein said article indexing means includes an indexing finger adapted to be engaged in an article recess, and means mounting said finger within the general confines of said movable holder for retracting movement axially of said movable holder and holding said finger fixed against rotational movement.

19. The holder unit of claim 17 wherein said movable holder has an outer recess for receiving an end portion of an article and an inner recess; and said article indexing means includes a plate recessed within said inner recess, means connecting said plate to said supporting shaft and fixing said plate against rotational movement relative to said supporting shaft, a finger adapted to be inserted in an article recess, said finger being carried by said plate for retracting movement axially of said movable holder.

20. The holder unit of claim 17 wherein said movable holder has an outer recess for receiving an end portion of an article and an inner recess; and said article indexing means includes a plate recessed within said inner recess, means connecting said plate to said supporting shaft and fixing said plate against rotational movement relative to said supporting shaft, a finger adapted to be inserted in an article recess, said finger being carried by said plate for retracting movement axially of said movable holder, and resilient means reacting on said finger and holding said finger in a projected position while resiliently resisting retraction of said finger.

21. For use in combination with a printing machine of the type including a rotary printing drum, article feed and indexing means for presenting articles each having a cylindrical portion on which printing is to take place to said printing drum in an indexed position, said article feed and indexing means comprising a plurality of holder units for supporting articles for rotation during the printing thereof, means mounting said holder units for movement about a predetermined path and for sequentially presenting articles to said printing drum, each of said holder units comprising a fixed holder member and a movable holder, a supporting shaft, means mounting said movable holder on said supporting shaft, for rotation about the axis of said supporting shaft, a housing supporting said supporting shaft for sliding movement axially of said supporting shaft to shift said movable holder between an article clamping position and a released position, article indexing means carried within said movable holder for indexing an article, said article indexing means including an indexing finger adapted to be engaged in an article recess, and means mounting said finger within the general confines of said movable holder for retracting movement axially of said movable holder and holding said finger fixed against rotational movement.

22. The holder unit of claim 21 wherein said movable holder has an outer recess for receiving an end portion of an article and an inner recess; and said article indexing means includes a plate recessed within said inner recess, means connecting said plate to said supporting shaft and fixing said plate against rotational movement relative to said supporting shaft, and said finger being carried by said plate for retracting movement axially of said movable holder.

References Cited in the file of this patent
UNITED STATES PATENTS

| | | |
|---|---|---|
| 2,718,847 | Jackson | Sept. 27, 1955 |
| 2,951,440 | Dubit | Sept. 6, 1960 |